United States Patent [19]

Palsgrove et al.

[11] Patent Number: 4,633,218

[45] Date of Patent: Dec. 30, 1986

[54] APPARATUS FOR RECEIVING LOW LEVEL DIGITAL SIGNALS TRANSMITTED OVER POWER LINES

[75] Inventors: Boyd H. Palsgrove, Minnetonka; Max Hendrickson, Forest Lake; Harry A. Cohen, Golden Valley, all of Minn.

[73] Assignee: Honeywell Inc., Minneapolis, Minn.

[21] Appl. No.: 562,646

[22] Filed: Dec. 19, 1983

[51] Int. Cl.⁴ ............................................. H04B 3/54
[52] U.S. Cl. ................................... 340/310 A; 375/88
[58] Field of Search ......... 375/88; 340/310 A, 310 R, 340/825.71, 825.73, 825.76

[56] References Cited

U.S. PATENT DOCUMENTS

| | | | |
|---|---|---|---|
| 2,605,359 | 7/1952 | Madsen | 375/88 |
| 2,909,606 | 10/1959 | Wennemer | 375/88 |
| 4,065,722 | 12/1977 | Francis | 375/88 |
| 4,174,517 | 11/1979 | Mandel | 340/310 A |

Primary Examiner—Douglas W. Olms
Assistant Examiner—Kenneth I. Rokoff
Attorney, Agent, or Firm—George Grayson; John S. Solakian

[57] ABSTRACT

Digital data is transmitted over AC power lines at typically a 300 baud rate and at a frequency of 130 kilohertz representing a binary ONE and 131 kilohertz representing a binary ZERO. Apparatus in the receiver relay including a quadrature detector converts the high frequency signals to digital binary signals which are applied to a microprocessor. The microprocessor generates signals to control relays in accordance with the information received from the AC power lines.

10 Claims, 4 Drawing Figures

APPARATUS FOR RECEIVING LOW LEVEL DIGITAL SIGNALS TRANSMITTED OVER POWER LINES

BACKGROUND OF THE INVENTION

1. Field of the Invention

This invention relates to the control of equipment by transmitting digital information over alternating current (AC) power lines and more particularly to apparatus that will receive the digital information in the form of attenuated signals reliably from the AC power lines.

2. Description of the Prior Art

The need for new, more effective control systems for building operations has never been greater. Now more than ever, businesses are turning to advanced central control technology to perform a number of tasks necessary for day-to-day operation. Until recently, however, the complexity and expense of system installation have prevented many building owners and managers from taking advantage of available technology. In many older buildings, it has proven too expensive or even impossible to install these systems because of hard-to-trace wiring or building construction obstacles. Even in newer buildings the cost of running hard control wiring to multiple remote points can be prohibitive. In either case, the costs associated with running wire are the most significant part of the cost of installation, in some buildings as much as 75 percent of the total.

Power line carrier systems effectively eliminate the need for major wiring jobs associated with control system installation. It utilizes the existing in-building AC power service to take the place of hard control wiring. The power line carrier systems can be used in a wide variety of applications, including environmental and energy management control, building and factory automation, remote lighting and process control. There are additional advantages for those who wish to employ control systems in temporary or leased locations. In these cases, the system can be moved easily to a new location or building, eliminating the need to rewire with every move or to leave the control wiring behind.

There are many advantages to using the power line carrier systems instead of hard wiring: installation becomes a much easier task; walls and ceilings are left intact; building occupants and tenants are not inconvenienced by messy installation and repair jobs; and total installation costs are easier to estimate and control.

Power line carrier systems are communication systems geared to pass commands from a master controller, typically a digital computer to energy-using devices. It is desirable to use the existing AC power lines for transmitting these commands between devices by using a radio frequency signal carrier. When large buildings or building complexes are involved, installation of the power line carrier system usually costs much less than installing new wiring between separate energy-using devices and the master controller.

The computer sends digital information to transmitters, typically a Honeywell TC720B transmitter which is described in the Tradeline Catalog No. 70-6910 copyright 1982 and published by the Residential Division, Honeywell Inc., Minneapolis, Minn. 55408.

The transmitter generates frequency shift keyed (FSK) radio signals and applies these signals to standard power lines for transmission to receiver relays, typically Honeywell R720B receiver relays described in the aforementioned Tradeline Catalog.

The transmitter transmits on all these phases of power distribution. The receiver relay receives the FSK radio signals for conversion to binary signals which are applied to a microprocessor. The addressed microprocessor provides output signals to control relays which in turn control the specific devices.

The prior art receiver relays consist of discrete components which are quite costly and have adequate sensitivity of typically 40 millivolts peak-to-peak. However, since the FSK signal being transmitted over the AC power line is attenuated by the varying loads on the power line such as motors, lights, industrial machinery, heating and ventilating equipment, office equipment and computing equipment, it is desirable to have a considerably improved sensitivity.

The power line concept is also applicable to the home environment. U.S. Pat. No. 4,174,517 entitled "Central System for Controlling Remote Devices Over Power Lines" describes such a system. This system, however, does not have the signal attenuation and signal noise problems that the power line carrier system has in its business environment.

OBJECTS OF THE INVENTION

Accordingly, it is a primary object of the invention to have an improved receiver relay for receiving transmitted signals over AC power lines.

It is an object of the invention to have a receiver relay having improved sensitivity.

It is another object of the invention to have a less costly receiver relay.

SUMMARY OF THE INVENTION

A number of receiver relays are coupled to an AC power line. A central controller, typically a digital computer, provides information to a transmitter which transfers the information to the AC power line at typically a 300 baud rate. The transmitter converts the information which it received in digital form in the form of binary bits to two frequencies, 130 kilohertz for a binary ONE and 131 kilohertz for a binary ZERO. The duration of each frequency is 3.3 milliseconds for the 300 baud rate.

The two frequencies are attenuated by variations in the normal power load on the AC power line. The receiver relay circuits will accept the attenuated signal as low as 5 millivolts peak-to-peak.

As in the prior art, the two frequencies are tapped off the AC power line by a coupling filter, amplified and clipped, thereby approximating square waves at the 130 kilohertz and 131 kilohertz frequencies. This invention includes quadrature detector tank circuits including a quadrature coil to receive the two frequencies and generate output signals which differ in phase by 90 degrees. The quadrature detector removes the baseband signal from the carrier frequency and generates digital output signals. The digital output signal representative of the 130 kilohertz frequency signal is shaped by a comparator to a 5 volt square wave of 3.3 milliseconds in duration and the digital output signal representative of the 131 kilohertz frequency signal appears as 0 volts for 3.3 milliseconds.

A microprocessor receives the square wave signals and processes the information after verifying that the address set up in switches in the receiver relay agrees with the address contained in the information. The receiver relay then performs the central function specified by the information.

BRIEF DESCRIPTION OF THE DRAWINGS

The novel features which are characteristic of the invention are set forth with particularity in the appended claims. The invention set itself, however, both as to organization and operation may best be understood by reference to the following description in conjunction with the drawings in which:

DESCRIPTION OF THE PREFERRED EMBODIMENT

Figure 1:
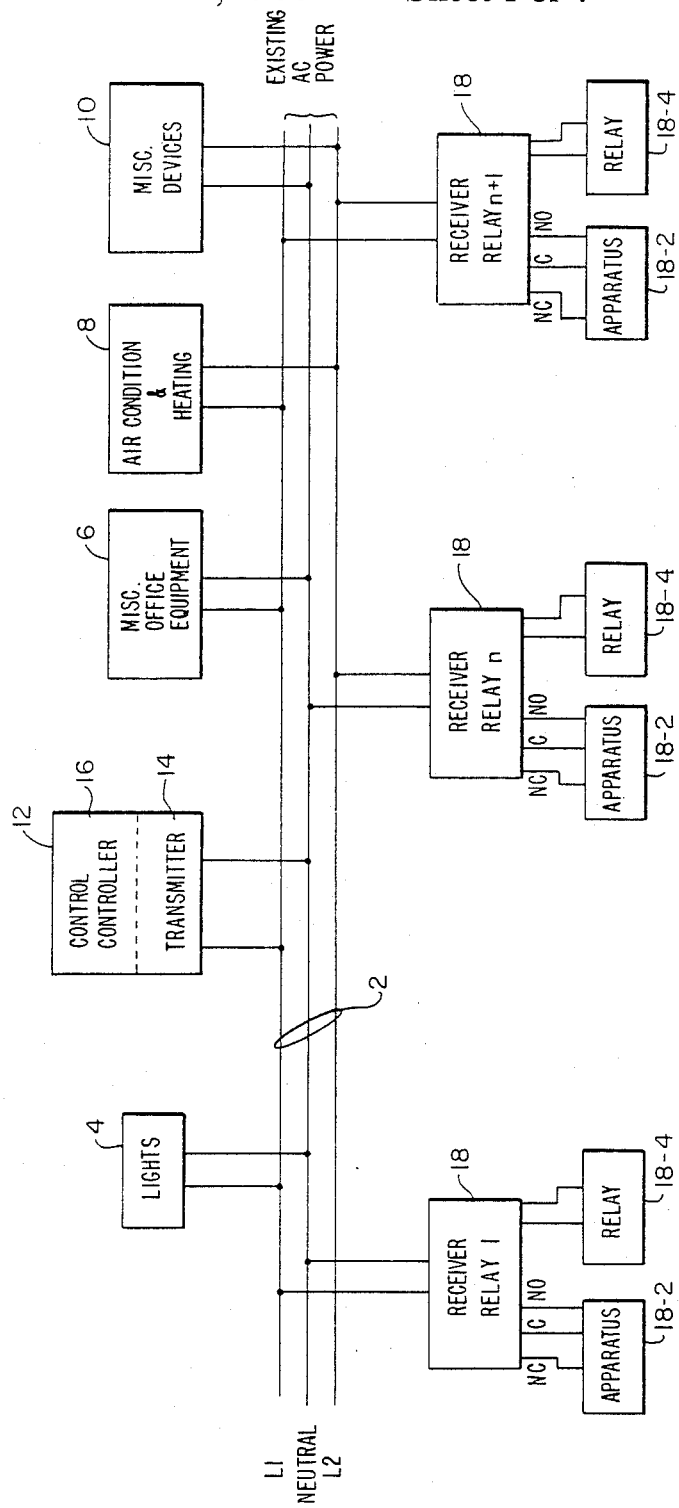
FIG. 1 is a block diagram showing a typical building environment in which a power line carrier system is operative.

FIG. 1 shows the overall building electrical system including a 50/60 hertz alternating current (AC) power line 2 having a phase line 2a, a neutral 2b and a phase line 2c. Typical voltage systems are 480V/277V wye, 208V/120V wye, 480V delta, 240V/120V delta (three phase or 120V/240V delta (single phase)).

Typical equipment drawing power from AC power line 2 are lights 4, miscellaneous office equipment 6, air conditioning and heating equipment 8, and miscellaneous devices 10.

Also coupled to the AC power line 2 is a central controller 12 which includes typically a digital computer 16 and a transmitter 14 which sends data signals over the AC power line 2. The Honeywell TC720B transmitter is described in the aforementioned Tradeline Catalog No. 70-6910 copyright 1982 and published by the Residential Division, Honeywell Inc., Minneapolis, Minn. 55408. A number of receiver relays including receiver relay 1 18 through receiver relay n+1 18 are coupled to AC power line 2 for receiving the data signals and responding to an address included in the data signals for activating a selected receiver relay 18. Typically, up to 64 receiver relays 18 may be coupled to AC power line 2. The receiver relay 18 may be coupled between the phase lines 2a and 2c or between neutral 2b and either phase line 2a or phase line 2c. Each receiver relay has as an output three signal lines: normally open (NO), common (COM) and normally closed (NC) which are the output signals of a relay transfer contact which are used to control the operation of its respective apparatus 18-2. Each receiver relays 18 also has as an output two signal lines which activate its respective relay 18-4. The apparatus 18-2 are typically heating, ventilating and air conditioning units (HVAC) and lights. The relays 18-4 are typically used to control the HVAC equipment and lights.

Figure 2:
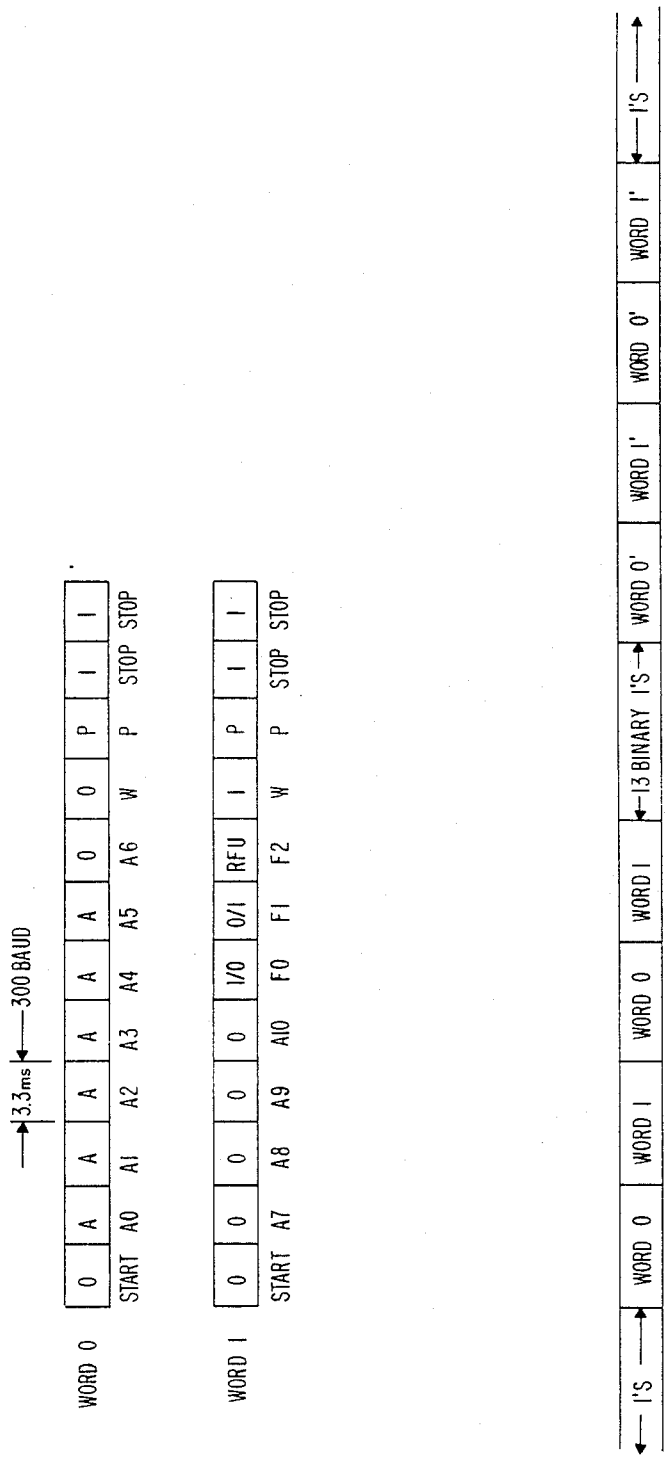
FIG. 2 shows the digital information being received by the receiver relay from the AC power line.

Data signals as shown in FIG. 2 are typically transferred over AC power line 2 at a 300 baud rate as binary data. A binary ONE is represented by a carrier frequency of 130 kilohertz for 3.3 milliseconds and a binary ZERO is represented by a carrier frequency of 131 kilohertz for 3.3 milliseconds. Both the 130 KHZ and 131 KHz carrier frequencies appear between all phases of the 50/60 Hz AC power line 2. The carrier frequencies applied to AC power line 2 by the transmitter 14 are typically 12 volts peak-to-peak into a 10 ohm load.

The transmitter 14 sends out signals representing 4 data words on AC power line 2 in start-stop mode (asynchronous mode). The 130 kilohertz carrier signal indicating a string of binary ONE bits appears on AC power line 2 when no data is being transferred.

The transmitter 14 sends out a frequency of 131 kilohertz for 3.3 milliseconds indicating a binary ZERO bit or a start bit. All of the receiver relays 18 receive this start bit. Following the start bit the transmitter 14 for word 0 sends out a sequence of 7 address bits A0 through A6, followed by a word identification bit W at binary ZERO indicating that this is word 0, followed by a parity bit, followed by two stop bits, each at binary ONE. The transmitter 14 immediately sends out the start bit for word 1 followed by 4 address bits A7 through A10, followed by an F0 bit, an F1 bit and an F2 bit, followed by the word identification bit W at binary ONE indicating that this is word 1, followed by a parity bit, followed by two stop bits. Each message includes four data words: word 0 followed by word 1, followed by word 0, followed by word 1, and followed by 13 binary ONE bits. Each receiver relays 18 receives all of the data words but only the receiver relay that is addressed by data bits A0 through A10 responds to the message by setting output relay 42, FIG. 3, if data bit F0 is at binary ONE and setting relay 18-4 if data bit F1 is at binary ONE.

If output relay 42 or relay 18-4 is set, then a message with F0 at binary ZERO or F1 at binary ZERO will reset the respective relay. Data bit F2 is a spare bit reserved for future use. The message is ignored if the two word 0 data words are different or if the two word 1 data words are different. Successive four word data messages are separated by 13 binary ONE bits, the carrier frequency of 130 kilohertz for approximately 43 milliseconds.

Figure 3:
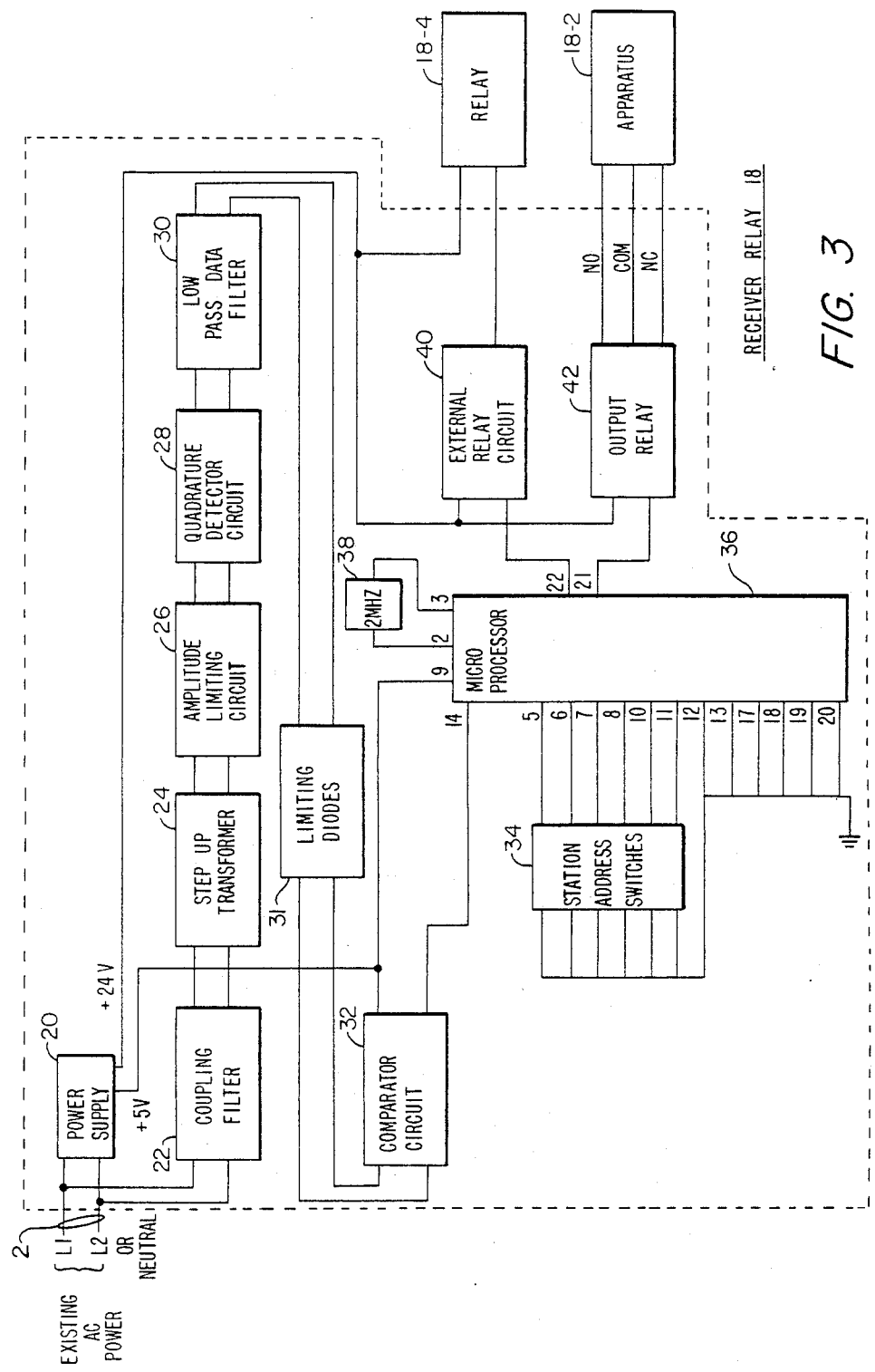
FIG. 3 is a block diagram of the receiver relay circuits.
Figure 4:
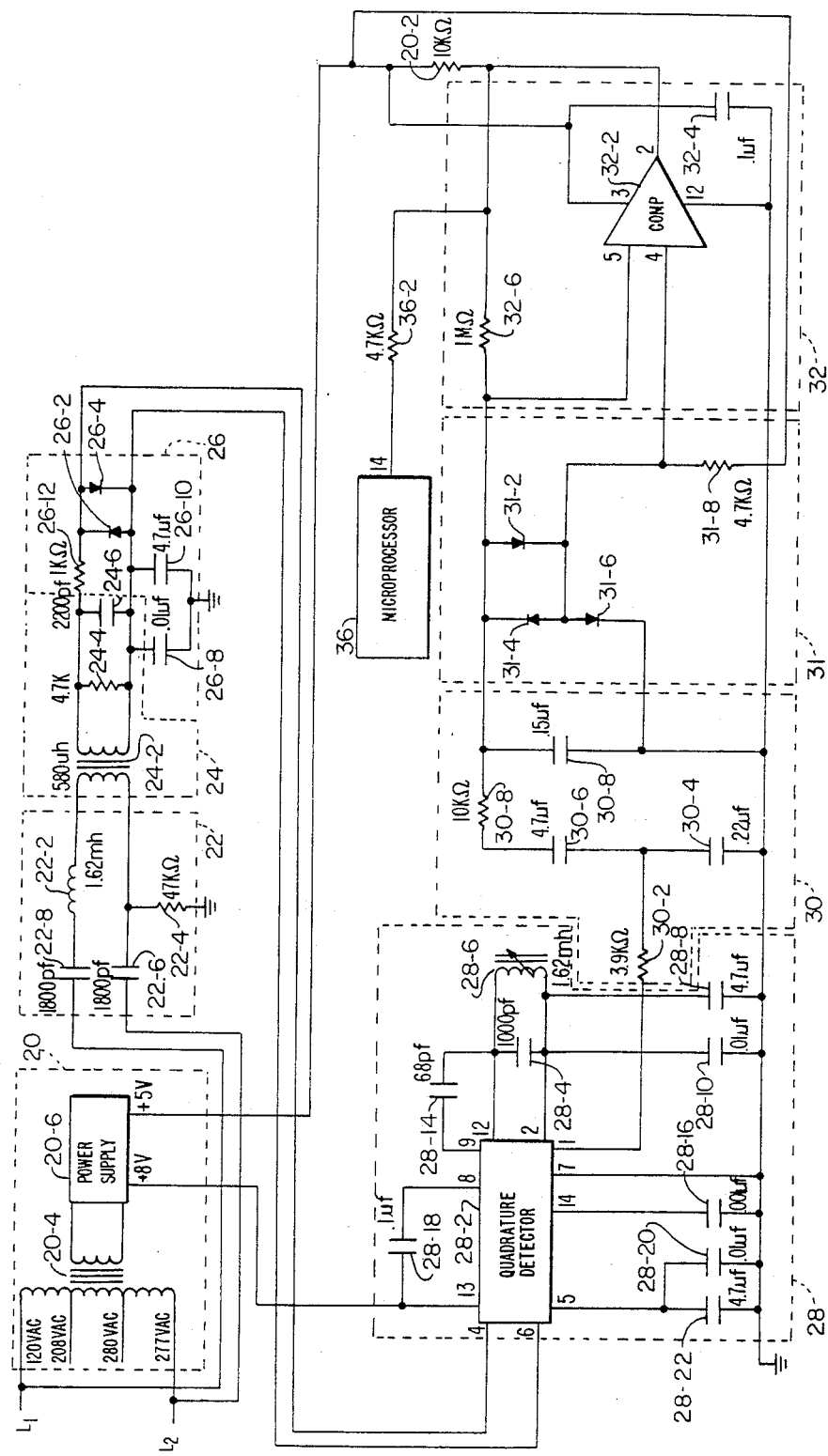
FIG. 4 is a detailed diagram of the quadrature detector and its associated circuits.

Referring to FIGS. 3 and 4, the AC power line 2 is connected between one of the voltage taps of a transformer 20-4 and a common terminal, depending upon the AC system voltage. The 130 KHz and 131 KHz data signals from AC power line 2 are received at the power receiver 18 through a line coupling network including a transformer 20-4 of power supply 20, a pair of 1800 picofarad coupling capacitors 22-6 and 22-8, a 1.62 millihenry inductor, and a 4.7K ohm resistor 24-4 of coupling filter 22. Also included in the line coupling network is the primary coil of a transformer 24-2 of step-up transformer 24.

Note that the input data signal provided by the transmitter 14 to the AC power line 2 is typically 12 volts peak-to-peak into a 10 ohm load, the data signal received at the receiver relay 18 may be attenuated to as small a signal as 5 millivolts peak-to-peak.

The 130 KHz signals which are now separated from the 50 or 60 cycle power are amplified by 580 microhenry transformer 24-2, the secondary winding of which is tuned to the 130.5 KHz signal by a 4.7K ohm resistor 24-4 and a 2200 picofarad capacitor 24-6.

The data signal which appears across a 1K ohm resistor 26-12 is limited by diodes 26-2 and 26-4 of amplitude limiting diodes 26 to reduce noise spikes and prevent circuit overloading. The output signal approaches a 130 KHz or 131 KHz square wave. A 0.01 microfarad capacitor 26-8 and a 4.7 microfarad capacitor filter out any noise spikes to ground.

The signal now goes to the quadrature detector portion of the quadrature detector circuit 28, FIG. 4, where the baseband data signal is extracted from the carrier.

The quadrature detector portion is tuned to the incoming carrier frequency and is made up of logic (not shown) in the quadrature detector 28-2 plus the parallel tank circuit made up of a 1.62 millihenry quadrature coil 28-6, a 1000 picofarad capacitor 28-4 in parallel across pins 2 and 12, and a 68 picofarad capacitor 28-3 between pins 9 and 12. The 90 degree phase shift between the 130 KHz and 131 KHz signals takes place in these components.

The quadrature detector 28-2 is typically an MC1357 IF amplifier and quadrature detector described in the Motorola Linear Circuits Catalog published by Motorola Semiconductor Products Inc. of Phoenix, Ariz. 85036.

The baseband data is partially filtered by a 0.001 microfarad capacitor 28-16 applied between ground and pin 14 forming a lowpass filter. The decoupling of the quadrature detector 28-2 to prevent excess noise is accomplished by a 4.7 microfarad capacitor 28-22 and a 0.01 microfarad capacitor 28-20 coupled between pin 5 and ground, and a 0.01 microfarad capacitor 28-10 and a 4.7 microfarad capacitor 28-22 coupled between pin 5 and ground. Approximately +8 volts is applied to pin 13 and pins 7 and 8 are at ground. A 0.1 microfarad capacitor 28-18 applied between pins 13 and 8 filters out any noise spikes appearing on that +8 volt line.

The baseband signal representing the data is then buffered to the outside via pin 1. The signal level at pin 1 is a 3.6 volt peak-to-peak square wave riding on a 4 volt DC level. The baseband signal is AC coupled to lowpass data filter 30 by a 4.7 microfarad capacitor 30-6. It is then filtered through lowpass data filter 30 which is made up of a 3.9K ohm resistor and a 0.22 microfarad capacitor 30-4 to ground, a 10K ohm resistor 30-8 coupled to the junction of the capacitor 30-4 and the resistor 30-2, and a terminal of a 0.15 microfarad capacitor 30-8. The other side of capacitor 30-8 is coupled to ground. The cutoff of the lowpass data filter 30 is approximately 150 hertz at 3 DB down.

The filtered signal is applied across a network made up of diodes 31-2, 31-4 and 31-6 which clips the signal to a 0.6 volt level by diodes 31-2 and 31-4. The clipped signal is applied to pin 4 of a comparator 32-2 of a comparator circuit 32. The junction of a diode 31-6 and a 4.7K ohm resistor 31-8 to +5 volts provides the reference voltage to pin 4 of the comparator 32-2. The filtered signal is applied to pin 5. The output pin 2 of comparator 32-2 provides output signals of +5 volts for a binary ONE when the voltage on pin 5 is higher than the reference voltage on pin 4 and 0 volts for a binary ZERO when the voltage on pin 5 is lower than the reference voltage which are applied to pin 14 of a microprocessor 36. A 0.1 microfarad capacitor 32-4 filters to ground any noise on the +5 volts signal line coupled to pin 3. A one megohm resistor 32-6 sets the gain of comparator 32-2. The comparator 32-2 is typically a National Semiconductor LM3302 circuit described in the National Semiconductor Linear Data Book—1982.

A 10K ohm resistor 20-2 acts as a pull-up resistor and a 4.7K ohm resistor 36-2 limits the current to pin 14 of the microprocessor 36.

The data signals are applied to a serial input pin 14 of a microprocessor 36. The microprocessor 36 is typically a National Semiconductor COP421C single chip CMOS microcontroller as described in the April 1980 specification entitled "COP420C/COP421C and COP320C/COP321C single chip CMOS Microcontrollers" published by National Semiconductor Corporation, 2900 Semiconductor Drive, Santa Clara, Calif. 95051. The microprocessor 36 uses the 2 megahertz crystal oscillator 38 applied across pins 2 and 3 to generate the internal clock. Ground is applied to pin 13 and +5 volts is applied to pin 9.

Each microprocessor 36 receives word 0 and compares address bits A0 through A5, FIG. 2, with their respective switch settings of station address switches 34. Only the addressed microprocessor 36 will process the remainder of the message consisting of word 1 followed by word 0, followed by word 1. The addressed microprocessor 36 will verify the parity bit for each word and will compare the two word 0's and the two word 1's for equals. Microprocessor 36 will then generate an output signal from pin 21 to energize output relay 42 if bit F0 were a binary ONE and generate an output signal from pin 22 to activate an external relay circuit 40 if F1 were a binary ONE.

When output relay 42 is energized, the normally open (NO) contact completes the circuit to the common (COM) contact and breaks the circuit between the COM contact and the normally closed (NC) contact. When output relay 42 is deenergized, the circuit is completed between the COM and NC contacts and open between the COM and NO contacts. The NO, COM and NC contact closures control the operation of apparatus 18-2.

The external relay circuit generates a signal to activate the relay 18-4. Power supply 20 generates +24volts to supply power to energize the relays and +5 volts to control the circuits.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A power line carrier system includes a central controller and a plurality of receiver relays, all coupled in common to an alternating current (AC) power line, said central controller transmitting information over said AC power line in the form of high frequency signals, each of said plurality of receiver relays having apparatus for receiving and converting said high frequency signals to digital signals, said apparatus comprising:

first means coupled to said AC power line for receiving said high frequency signals, said first means comprising capacitor means and inductor means tuned to a midpoint between first and said second frequencies of said high frequency signals for tapping off said first frequency signal and said second frequency signal from said AC power line;

second means coupled to said first means for increasing the amplitude of said high frequency signals, said second means comprising transformer means for increasing the voltage amplitude of said first frequency signal and said second frequency signal;

third means coupled to said second means for clipping off the top and bottom of said high frequency signals;

quadrature detector means coupled to said third means for receiving the first frequency signal of said high frequency signals representative of a binary ONE and receiving the second frequency signal of said high frequency signals representative of a binary ZERO and generating a corresponding binary ONE signal and a binary ZERO signal;

fourth means coupled to said quadrature detector means for generating a voltage signal in a first state representative of said binary ONE signal and generating said voltage signal in a second state representative of said binary ZERO signal; and fifth means coupled to said fourth means and responsive to a sequence of said voltage signals in said first and said second states representative of said information for performing a function of specified by said information.

2. The apparatus of claim 1 wherein said quadrature detector means comprises:

first quadrature means for generating said first frequency signal having a first phase and said second frequency signal having a second phase; and second quadrature means being responsive to said first frequency signal having said first phase for generating said binary ONE signal, and being responsive to said second frequency signal having said second phase for generating said binary ZERO signal.

3. The apparatus of claim 2 wherein said fourth means comprises:

lowpass filter means for filtering said binary ONE signal and said binary ZERO signal;

diode limiting means for receiving said filtered binary ONE signal and said filtered binary ZERO signal and generating a clipped binary ONE reference signal and a clipped binary ZERO reference signal; and comparator means responsive to said filtered binary ONE signal and said clipped binary ONE reference signal for generating said voltage signal in said first state, said comparator means being responsive to said filtered binary ZERO signal and said clipped binary ZERO reference signal for generating said voltage signal in said second state.

4. The apparatus of claim 3 wherein said voltage signal in said first state is plus five volts representative of a binary ONE information bit and said voltage signal in said second state is zero volts representative of a binary ZERO information bit.

5. The apparatus of claim 4 wherein said fifth means is a microprocessor.

6. A power line carrier system comprises:

an alternating current (AC) power line;

central controller means coupled to said AC power line for transmitting information in the form of high frequency carrier signals over said AC power line;

receiving means coupled to said AC power line for receiving said high frequency carrier signals and generating binary data signals;

said receiving means including quadrature circuit means for generating a first frequency signal having a first phase in response to a first frequency of said high frequency carrier signals representative of a binary ONE data bit, said quadrature circuit means further generating a second frequency signal having a second phase in response to a second frequency of said high frequency carrier signals representative of a binary ZERO data bit;

said receiving means further having quadrature means coupled to said quadrature circuit means and responsive to said first frequency signal having said first phase for generating a voltage signal having a first voltage level representative of said binary ONE data bit, and responsive to said second frequency signal having said second phase for generating said voltage signal having a second voltage level representative of said binary ZERO data bit;

shaping means coupled to said receiving means for receiving said voltage signal and having means for comparing said voltage signal with a reference voltage, and generating a binary ONE signal when said voltage signal having said first voltage level is received by said shaping means, and generating a binary ZERO signal when said voltage signal having said second voltage level is received by said shaping means;

microprocessor means coupled to said shaping means and responsive to a sequence of said binary ONE signals and said binary ZERO signals representative of said information for generating control signals in response to said information; and relay means responsive to said control signals for controlling apparatus.

7. The system of claim 6 wherein said first phase and said second phase are 90 degrees apart.

8. The system of claim 6 wherein said binary ONE signal is plus five volts and said binary ZERO signal is zero volts.

9. The system of claim 6 wherein said first frequency of said high frequency carrier signals is at 130 kilohertz and said second frequency of said high frequency carrier signals is at 131 kilohertz.

10. The system of claim 6 wherein said apparatus includes heating, ventilating and air conditioning equipment.

* * * * *